(12) United States Patent
Nishida (10) Patent No.: US 7,896,635 B2
(45) Date of Patent: Mar. 1, 2011

(54) METHOD AND APPARATUS FOR FORMING HOLLOW MOLDINGS HAVING THIN FILM ON INNER SURFACE

(75) Inventor: Shoso Nishida, Hiroshima (JP)

(73) Assignee: The Japan Steel Works, Ltd., Tokyo (JP)

( * ) Notice: Subject to any disclaimer, the term of this patent is extended or adjusted under 35 U.S.C. 154(b) by 320 days.

(21) Appl. No.: 11/528,616

(22) Filed: Sep. 28, 2006

(65) Prior Publication Data

US 2008/0079191 A1 Apr. 3, 2008

(51) Int. Cl.
*B29C 63/00* (2006.01)
(52) U.S. Cl. .......................... 425/90; 425/98; 425/100
(58) Field of Classification Search .................. 264/81, 264/82, 83, 250, 255; 425/90, 98, 100; 118/715, 118/723 E, 722, 723 R
See application file for complete search history.

(56) References Cited

U.S. PATENT DOCUMENTS

| | | | |
|---|---|---|---|
| 3,504,063 A | * | 3/1970 | Lemelson .................. 264/430 |
| 2003/0165706 A1 | * | 9/2003 | Abbott et al. ............... 428/577 |
| 2005/0229851 A1 | * | 10/2005 | Hama et al. .............. 118/723 E |

FOREIGN PATENT DOCUMENTS

| | | |
|---|---|---|
| JP | 53-113243 U | 9/1978 |
| JP | 2-38377 B2 | 8/1990 |
| JP | 3047213 B2 | 3/2000 |
| JP | 3326752 B2 | 7/2002 |
| JP | 2004-338328 A | 12/2004 |
| JP | 2005-962 A | 1/2005 |
| JP | 2006-224449 A | 8/2006 |

OTHER PUBLICATIONS

Chinese Office Action dated May 8, 2009.

* cited by examiner

*Primary Examiner*—Joseph S Del Sole
*Assistant Examiner*—James Sanders
(74) *Attorney, Agent, or Firm*—Sughrue Mion, PLLC (57) ABSTRACT

A movable mold and a slide mold are employed. There is also employed a deposition apparatus which is equipped with a deposition element such as a target electrode in the inside of a depositing chamber. A body portion and a cover member are primarily molded by the movable mold and the slide mold. The molds are opened while the body portion being left in the movable mold and while cover member being left in slide mold. The body portion left in the movable mold is deposited in the molds with its inner surface being covered with the depositing chamber. Next, the slide mold is driven so that the cover member may be registered with the deposited body portion. Then, a secondary molding resin is injected to integrate the body portion and the cover member.

7 Claims, 5 Drawing Sheets

FIG. 5F

METHOD AND APPARATUS FOR FORMING HOLLOW MOLDINGS HAVING THIN FILM ON INNER SURFACE

This application is based on Japanese Patent Application No. 2005-168984, which is incorporated herein by reference.

BACKGROUND OF THE INVENTION

1. Field of the Invention

The present invention relates to a method for forming a hollow molding having a thin film on its inner surface, comprising: a primary molding step of injection-molding a pair of semi-hollow bodies by using a stationary mold and a movable mold made movable with respect to the stationary mold, so that its opening may have an abutment portion; a depositing step of forming a thin film on the inner surface of at least one of the semi-hollow bodies formed by the primary molding; and a secondary molding step of integrating the paired semi-hollow bodies to acquire the hollow body, by abutting the opening of the paired semi-hollow bodies deposited, in an upper state where they are left in the molds, and by injecting a molten resin to the abutting portions, a hollow molding obtained by executing the molding method, and a molding apparatus to be used for executing the molding method.

2. Description of the Related Art

A hollow molding having a thin film of several micron orders partially on the inner surface of a hollow body can be exemplified by a front lamp or a tail lamp, which is attached to a vehicle. This lamp is composed of a recessed body portion having an electric bulb, and a lens unit integrally attached to the opening of the body portion. The body portion is molded by an injection molding method, for example, and is suspended in a deposition-dedicated vacuum tank by means of a dedicated hanger while its unnecessary portion such as an outer surface being masked. The body portion is then formed with a thin film by the later-described deposition method. The body portion having the thin film and a lens portion molded separately are set in their individual molds such that the opening of the body portion and the edge of the lens portion are aligned to abut against each other. The body portion and the lens portion are integrated by injecting a molten resin into the abutting joint portion thereby to form a hollow molding having a thin film on its inner surface.

The deposition method for forming a thin film on the inner surface of that body portion or on the surface of a substrate such as the body portion is known in the art. There are known: the sputtering method, in which the thin film is formed by arranging the substrate to be deposited and the target in a confronting manner and by applying and discharging a negative voltage of several kV to the target in an argon gas atmosphere of several Pa to several tens Pa; the vacuum deposition method, in which the film is formed by housing the substrate and the evaporation source in a vacuum container; the ion plating method, in which the vacuum deposition is performed in an argon gas under a pressure of several Pa by applying a negative voltage of several kV to the substrate; and the chemical deposition method.

JP-B-2-38377 discloses a method for forming a hollow molding by an injection molding. Specifically, the hollow molding forming method includes: a primary molding, in which a pair of semi-hollow moldings are so formed by a pair of cavities formed by the stationary mold and the slide mold as to have a joint portion around their opening; and a secondary molding, in which the molds are opened so that one primary semi-hollow molding is left on the stationary mold whereas the other primary semi-hollow molding is left on the slide mode, in which the slide mold is slid to the position where the joint portions of the paired primary semi-hollow molding are registered, in which the molds are then mold clamped, and the joint portions are jointed by injecting the molten resin thereto. Moreover, Japanese Patent No. 3,326,752 discloses such one of the molding method of JP-B-2-38377, that a guide portion is integrally formed at the primary molding time on the inner side of the joint portion or the abutting portion of one primary semi-hollow molding, and that the abutting portion of the other primary semi-hollow molding is guided for the secondary molding, when it is fitted on the abutting portion of one primary semi-hollow molding, by the guide portion of the abutting portion of the one primary semi-hollow molding. On the other hand, Japanese Patent No. 3,047,21 discloses a molding method, in which the hollow molding is formed, as described above, by injecting and filling the resin so that the angle made by the abutting portion from the injecting and filling point at the secondary molding time may be 90 degrees or less.

When the hollow molding having the thin film on its inner surface is to be formed by the method of the related art, there arise many problems because the body portion has to be formed in advance by the injection molding method and has to be transferred into the vacuum tank for the deposition. For example, the body portion is molded in advance and is stored. Therefore, the body portion may be soiled on its surface with sand or dust while being stored, so that it may cause a deposition failure. In order to avoid this, the handling of the body portion requires the highest care and raises the cost. On the other hand, the prefabricated body portion is once stored so that its storage raises a management problem. In addition, the body portion has to be once extracted from the mold before it is deposited, and has to be again mounted in the mold before it is jointed, thus lowering the productivity.

On the other hand, the injection molding method, as disclosed in JP-B-2-38377, is advantageous not only in that the individual steps can be automated to mass-produce the hollow moldings but also in that even the hollow moldings of complicated shapes can be manufactured. According to the invention of Japanese Patent No. 3,326,752, on the other hand, even with more or less deformations, the abutting portions can be brought into fine abutment thereby to raise an effect that the resin for the secondary molding has no leakage. Moreover, the invention of Japanese Patent No. 3,047,213 is characterized in that its joint strength is so high that the molten resin for the secondary molding can be molded even with less injection portions. Because of those advantages and features, the inventions are effectively practiced still at this time. The molding methods of the related art, however, cannot form the thin film of the order of several microns on the inner surface of the hollow molding.

SUMMARY OF THE INVENTION

By applying the injection molding method of the related art, the present invention contemplates to provide a molding method having solved the aforementioned problems of the related art, and has an object to provide a method for forming a hollow molding having a thin film on its inner surface, which has any deposited face contamination so that its quality is not deteriorated by the deposition failure, which does not need any special storage management, and which can be automatically molded with ease, a hollow molding obtained by the molding method, and a molding apparatus to be used for practicing that molding method.

In order to achieve the aforementioned object, according to the invention, the inner surface of at least one of the paired semi-hollow bodies formed of the stationary mold and the movable mold is deposited in the mold while being left in the stationary mold or the movable mold, by covering it with a deposition chamber having a deposition element such as a target electrode, a substrate electrode or a vacuum suction pipe therein. The openings of one semi-hollow body and the other semi-hollow body deposited are made to abut against each other, and the molten resin is injected to fill up and integrate the abutting portions.

In order to achieve the above-specified object, according to a first aspect of the invention, there is provided a method for forming a hollow molding having a thin film on its inner surface, comprising: a primary molding comprising injection-molding a pair of semi-hollow bodies by using a stationary mold and a movable mold made movable with respect to the stationary mold so as its opening to have an abutment portion; a depositing comprising: opening the molds such that the one semi-hollow body is left on the side of the stationary mold whereas the other semi-hollow body is left on the movable mold; and forming a thin film on the inner surface of at least one of the semi-hollow bodies formed by the primary molding; and a secondary molding comprising: abutting the opening of the paired semi-hollow bodies deposited in a state where they are left in the molds; and injecting a molten resin to the abutting portions so as to integrate the paired semi-hollow bodies and acquire the hollow body, wherein the forming a thin film in the depositing is carried out in the molds by covering the semi-hollow bodies left in the molds with a depositing chamber including a deposition element comprising a target electrode, a substrate electrode and a vacuum suction pipe.

According to a second aspect of the invention, the movable mold is slidable to a first molding position and a second molding position with respect to the stationary mold.

According to a third aspect of the invention, there is provided a hollow molding having a thin film on its inner surface formed by the forming method according to the first aspect of the invention.

According to a fourth aspect of the invention, there is provided a molding apparatus for forming a hollow molding having a thin film on its inner surface, comprising a molding device comprising: a stationary mold comprising a stationary core and a stationary recess on a parting line side for forming paired semi-hollow bodies; and a movable mold movable to a first molding position and a second molding position with respect to the stationary mold, comprising a movable recess and a movable core on a parting line side for coacting with the stationary core and the stationary recess; and a depositing device, wherein a pair of semi-hollow bodies are primarily formed at the first molding position of the movable mold by the stationary core and the movable core and by the stationary recess and the movable core, wherein the paired semi-hollow bodies left in the stationary recess and the movable recess are secondarily formed and integrated at the second molding position of the movable mold, wherein the depositing device comprises a depositing chamber to be inserted between the parting lines of the molds when opened, and wherein the depositing chamber comprises: seal means disposed at its opening and forced in a gas-tight state to contact with the parting line face of the stationary mold or the movable mold, and a deposition element comprising a target electrode, a substrate electrode and a vacuum suction pipe. According to a fifth aspect of the invention, the movable mold is turnable to the first molding position and the second molding position with respect to the stationary mold.

Thus, according to the invention, the inner surface of at least one of the paired semi-hollow bodies formed of the stationary mold and the movable mold is deposited in the mold while being left in the stationary mold or the movable mold, by covering it with a deposition chamber having a deposition element such as a target electrode, a substrate electrode or a vacuum suction pipe therein. Specifically, the semi-hollow bodies are not taken out from the mold but are deposited in the mold by using the depositing chamber, so that the deposited face is not soiled on its surface with hand or dust. According to the invention, therefore, it is possible as a special effect to provide a hollow molding of an excellent deposited quality having the thin film on its inner surface. Moreover, the deposition is performed in the mold while the semi-hollow bodies are left in the mold, so that the semi-hollow bodies need no storage management. Merely by preparing a deposition apparatus, moreover, there is attained another advantage that the automatic molding can be inexpensively formed without employing any special mold.

BRIEF DESCRIPTION OF THE DRAWINGS

FIGS. 3A to 3D are sectional diagrams schematically showing the individual molding steps using the mold according to the first embodiment of the invention.

FIGS. 4A to 4C are sectional diagrams showing a mold according to a second embodiment of the invention: FIGS. 5A to 5F are diagrams showing a mold according to a third embodiment of the invention.

DETAILED DESCRIPTION OF THE PREFERRED EMBODIMENTS

Figure 1:
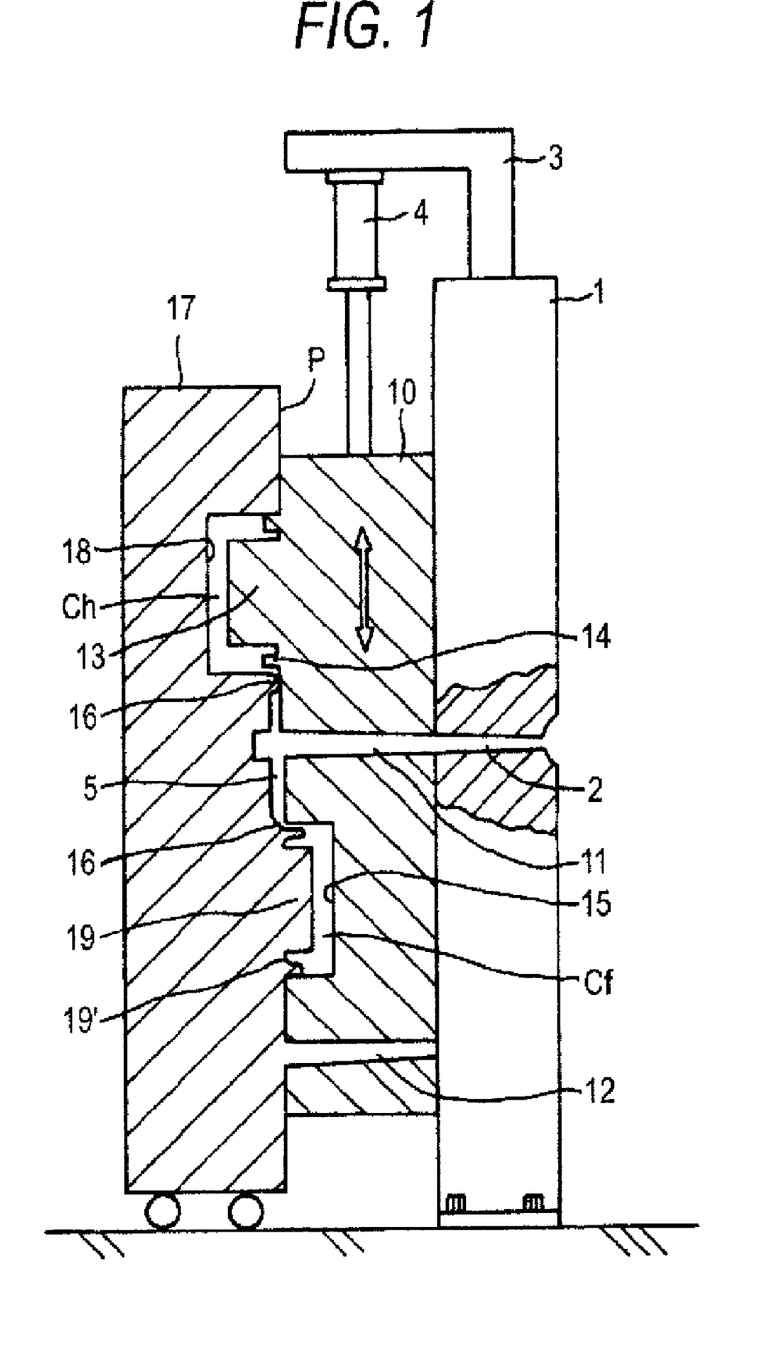
FIG. 1 is a sectional view showing a mold according to a first embodiment of the invention.

Here is described a molding example of a hollow molding article having a thin film in its inside, which is formed by injection-molding a cup-shaped body portion having a thin film such as a reflecting film on its inner surface and a thin lens-shaped cover member for sealing the opening of the body portion, by forming the thin film on the inner surface of the body portion in the mold, and by sealing the opening of the body portion with the cover member. An embodiment of the molding apparatus of the invention is described at first. FIG. 1 is a sectional view schematically showing the molding apparatus according to an embodiment of the invention with its mold being closed. According to a first embodiment, as shown in FIG. 1, the molding apparatus includes a stationary mold 1, a slide mold 10 and a movable mold 17. Moreover, the slide mold 10 is so attached to the stationary mold 1 as is driven to slide vertically, as shown in FIG. 1.

The stationary mold 1 is fixed on the base, as known in the art. In the embodiment shown in FIG. 1, one main sprue 2 is formed across the stationary mold 1. From the top of the stationary mold 1, there extends upward a support member 3, to which a piston cylinder unit 4 is attached for driving the slide mold 10. By feeding/releasing the working liquid to/from the piston cylinder unit 4, the slide mold 10 is driven to a first position, as shown in FIG. 1, or to an upper second position, as will be described hereinafter.

The slide mold 10 is equipped with a primary molding sprue 11 and a secondary molding sprue 12, which are vertically spaced at a predetermined distance. Of these, the primary molding sprue 11 is aligned at the first position shown in FIG. 1 with the main sprue 2 of the stationary mold 1. At a later-described second position, the second molding sprue 12 is aligned with the main sprue 2. The slide mold 10 is provided, at a position above a parting line face P, with a slide side core 13 for forming the cup-shaped body portion. Around and at a predetermined spacing from the slide side core 13, there is formed a small core 14 for forming a joint portion. At a position below the parting line face P, on the other hand, there is formed a slide side recess 15 for forming the cover member. A gate 16 is opened in the slide side recess 15.

In the side of the parting line face P of the movable mold 17, there is formed a movable side recess 18 for forming the body portion pairing the slide side core 13. The gate 16 is opened in that movable side recess 18. At the position of the movable mold 17 on the side of the parting line face P, there is formed movable side cover 19, which makes a pair with the slide side recess 15. Around and at a predetermined spacing from the slide side core 19, there is formed a small core 19' for forming the joint portion. On the side of the parting line face P of the movable mold 17, on the other hand, there is formed a runner 5 to be aligned with the main sprue 2 of the stationary mold 1.

Figure 2:
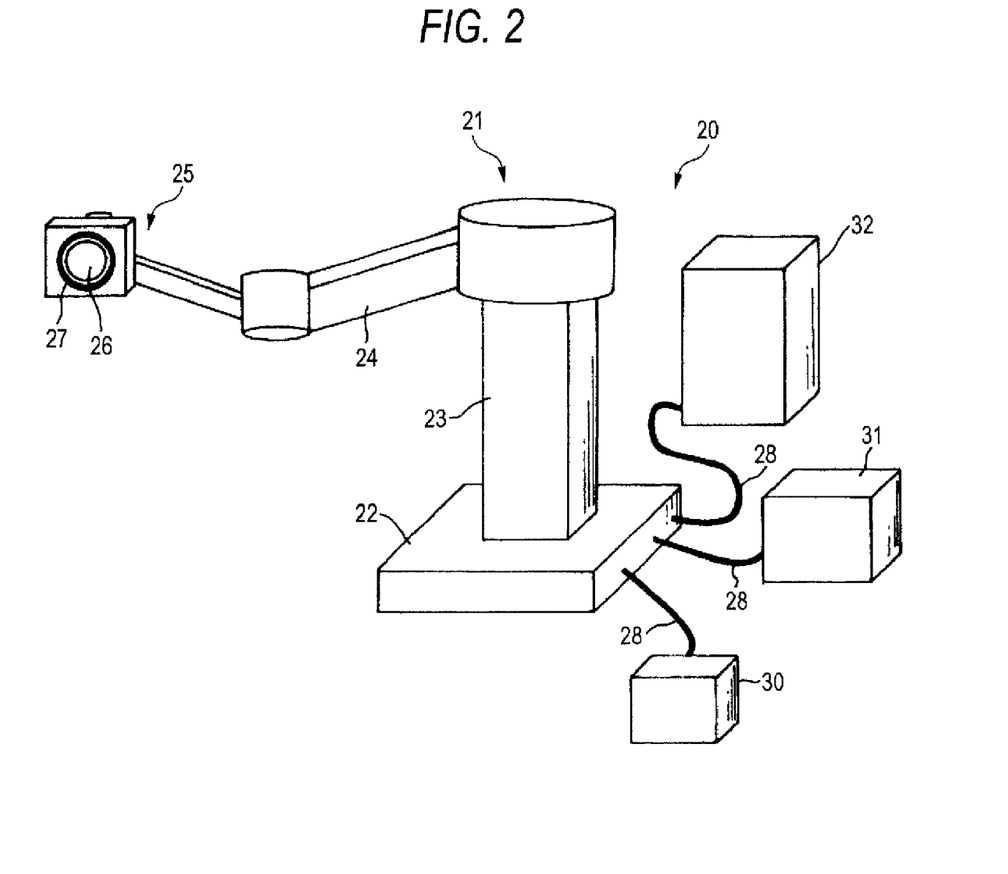
FIG. 2 is a perspective view schematically showing the embodiment of a deposition apparatus according to the invention.

FIG. 2 shows an embodiment of a deposition apparatus 20 schematically. According to the embodiment shown in FIG. 2, the deposition apparatus 20 includes a depositing chamber 25 attached to a multi-articulated robot 21. According to this embodiment, moreover, the sputtering method is applied, for example, the deposition apparatus 20 includes a vacuum source 30 having an exhaust pump necessary for the vacuum deposition, an inert gas tank or an inert gas supply device 31 for producing an inert gas such as a carbon dioxide gas, and a power source device 32. More specifically, a multi-articulated arm 24 is extended from the top of a stand 23, which is erected from the base 22 of the multi-articulated robot 21. The depositing chamber 25 is attached to the leading end portion of the multi-articulated arm 24. The depositing chamber 25 has a depositing recess 26 of a predetermined opening area or volume. In the opening of the depositing recess 26, on the other hand, there is disposed an o-ring 27, which is to be pushed into contact with the parting line face P of the slide mold 10. When the depositing recess 26 is pushed to contact through the O-ring 27 with the parting line face P of the movable mold 17 by a predetermined force, it encloses the body portion and forms the depositing chamber 25 of a vacuum necessary for the deposition.

In the depositing recess 26 thus constituted, there are disposed disposition elements. These disposition elements are not shown in FIG. 2, because the sputtering method is applied to this embodiment, but are exemplified by a target electrode near the opening of the depositing recess 26, and a substrate electrode disposed in the depth. These electrodes are connected with a DC or a high-frequency power source, and the substrate electrode is electrically connected with the substrate in the mold. In the depositing recess 26, moreover, there are opened not only a gas introduction pipe for introducing an inert gas such as an argon gas but also an evacuation pipe. These gas introduction pipe and evacuation pipe and the power feed lines connected with the electrodes are extended through the inside of the multi-articulated arm 24 and the stand 23 of the robot and are connected through connecting pipes 28, 28, . . . with the inert gas supply device 31, vacuum source 30 and power source device 32, respectively.

Next, a molding example using the molding apparatus according to the first embodiment is described with additional reference to FIG. 3. The slide mold 10 is mold clamped when it is at the lower first position, as shown in FIG. 1. Then, the slide side core 13 and the movable side recess 18 of the movable mold 17 define a body molding cavity Ch. On the other hand, the slide side recess 15 of the slide mold 10 and the movable side core 19 define a cover member molding cavity Cf. A molten resin is injected from the main sprue 2, as known in the art. Thus, the molten resin flows through the main sprue 2, the molding sprue 12, the runner 5 and the gates 16 and 16, and fills up the body molding cavity Ch and the cover member molding cavity Cf. By this primary molding, a body portion H and a cover member F are molded to have a jointing half groove M' around their opening. The state after the primary molding is shown in FIG. 3A.

Figure 3A:
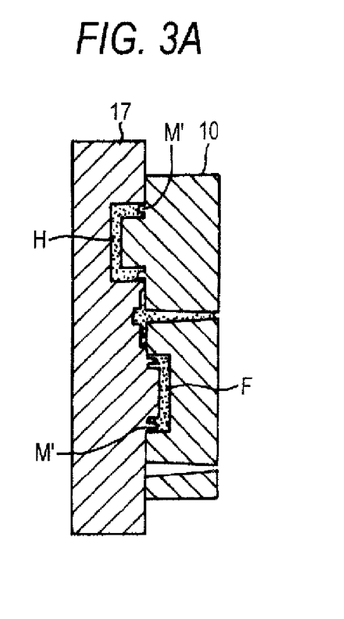
FIG. 3A is the state, in which the primary molding is ended.
Figure 3B:
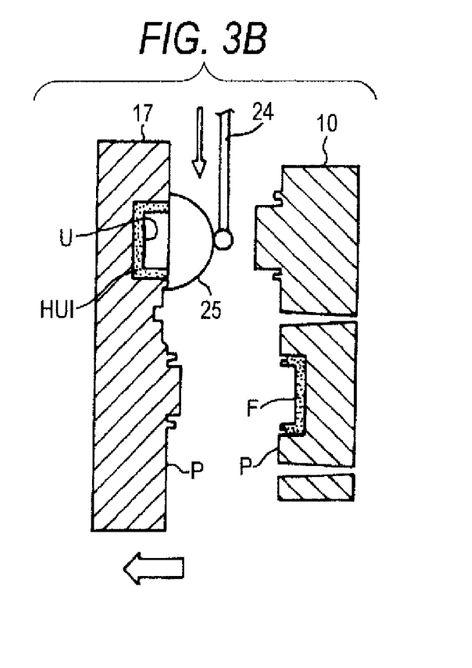
FIG. 3B is the deposited state.

After cooled and solidified, the movable mold 17 is opened to leave the body portion H in the movable mold 17 and the cover member F in the slide mold 10. By this mold opening operation, the inner surface of the body portion H is exposed to the parting line face P. Then, the depositing chamber 25 is inserted by using the multi-articulated robot 21 onto the parting line face P and is pushed, while enclosing the body portion H, onto the parting line face P of the movable mold 17 through the O-ring 27. This pushed state is shown in FIG. 3B. The vacuum source 30 and the inert gas supply device 31 of the deposition apparatus 20 are driven to establish an argon gas atmosphere of about several Pa to several tens Pa in the depositing chamber 25. Then, a discharge is established by applying a negative voltage to the target and a positive voltage of several CV to the body portion H. Then, a thin film U is formed on the inner surface of the body portion H, as known in the art, so that a body HU1 having the thin film is obtained.

Figure 3C:
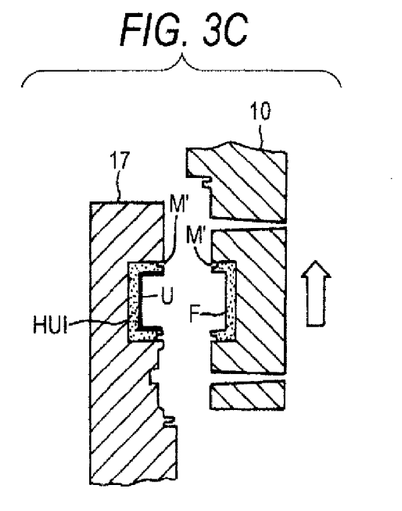
FIG. 3C is the step before the secondary molding is entered.
Figure 3D:
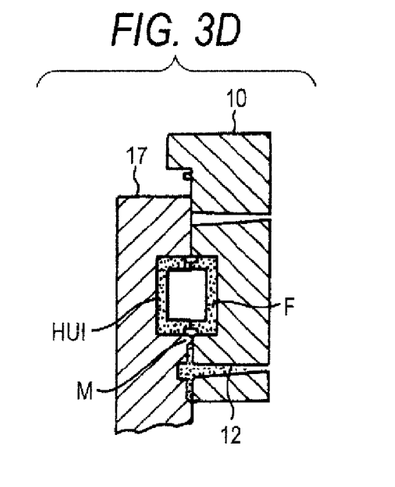
FIG. 3D is the state after the secondary molding.

After the deposition, the depositing chamber 25 is retracted from between the parting line faces P of the mold. Then, the slide mold 10 is slid to the upper secondary molding position, at which the openings of the body HU1 and the cover member F are registered. This registered position is shown in FIG. 3C. Then, as shown in FIG. 3D, the joint portion or a jointing cavity M is formed by halve grooves M' in the outer circumference of the abutting portions of the body HU1 and the cover member F. The molten resin is injected from the main sprue 2. This molten resin flows from the secondary molding sprue 12 through the gate into the jointing cavity M. By this secondary molding, the body HU1 and the cover member F are integrated. The movable mold 17 is opened to extract the hollow molding having the thin film on its inner surface. These molding operations are likewise continued on and on.

According to the first embodiment thus far described, the slide mold 10 and the movable mold 17 are provided with the recesses or cores for forming the paired body portion and cover member, so that what is produced in one cycle is only one hollow molding having the thin film. If, however, the recesses or cores are provided in a plurality of pairs, it is apparent that a plurality of hollow moldings can be formed in one cycle. Moreover, the structure of the jointing cavity should not be omitted to that of the embodiment, but can be so modified as is described in Japanese Patent No. 3,326,752 and Japanese Patent No. 3,047,213, as described hereinbefore.

Although the slide mold 10 is disposed at the stationary mold 1 in the first embodiment, such a second embodiment is shown in FIG. 4 that a slide mold 55 is disposed on a movable board 56 whereas a stationary mold 41 is disposed on a stationary board 40. This stationary board 40 is provided with one main sprue 42, which communicates with a runner 43 formed between the stationary board 40 and the stationary mold 41. The runner 43 communicates with primary molding first and second sprues 44 and 45 and a secondary molding third sprue 46. At the confluence between the main sprue 42 and the runner 43, moreover, there is disposed a sprue switching device RK, as proposed by the Applicant and disclosed in Japanese Patent No. 3,047,213. By operating this sprue switching device RK, the main sprue 42 is switched to the primary molding first and second sprues 44 and 45 or the secondary molding third sprue 46.

In the parting line face P of the stationary mold 41 thus formed, there is formed a stationary side core 50 for forming the body portion. Around and at a predetermined spacing from this stationary side core 50, there is formed a small core 51 for forming the joint portion. The primary molding first sprue 44 is opened into the top of the stationary side core 50. In the lower portion of the parting line face P, on the other hand, there is formed a stationary side recess 52 for forming the cover member. The primary molding second sprue 45 is opened into that recess 52.

Figure 4A:
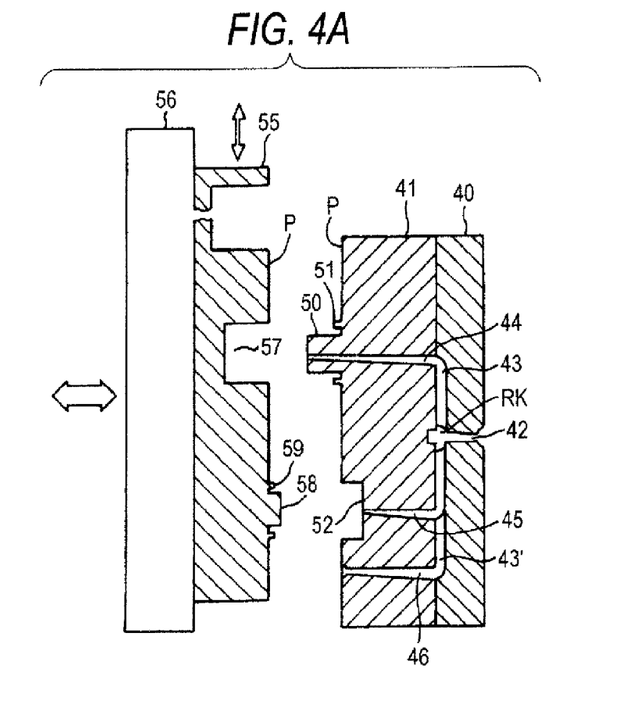
FIG. 4A is a sectional view showing the movable mold opened in an enlarged scale.

The slide mold 55 is mounted so mounted in the movable board 56 as can slide vertically, as shown in FIG. 4A. This slid mold 55 is driven by the actuator such as the piston cylinder unit, although this drive device is not shown. In the parting line face P of the slide mold 55, there is formed a slide side recess 57 corresponding to the stationary side core 50. At a predetermined position below the slide side recess 57, there is formed a slide side core 58 corresponding to the stationary side recess 52. Around the slide side core 58, there is formed a small core 59 for forming the joint portion.

Figure 4B:
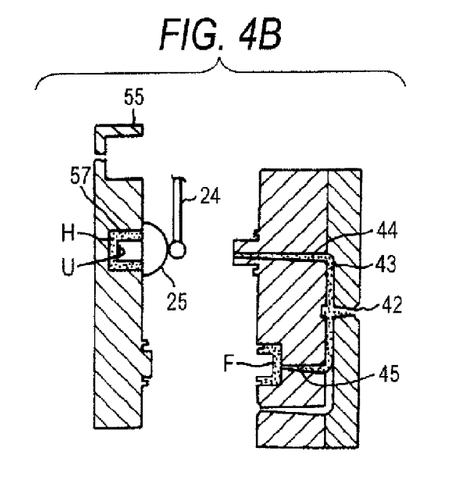
FIG. 4B is the depositing state.

Here is described a molding example. The mold is mold-clamped. Then, the stationary side cover and the slide side recess 57 establish a cavity for forming the body portion. At the same time, the stationary side recess 52 and the slide side core 58 form the cover member F. The sprue switching device RK is switched so that the molten resin may flow into the primary molding runner 43. Then, the molten resin is injected in the known manner from the main sprue 42. The molten resin flows from the main sprue 42, the sprue switching device RK, the runner 43 and the primary molding first and second sprues 44 and 45 so that it fills up the body portion forming cavity and the cover member forming cavity. As a result, the body portion H and the cover member F are molded substantially simultaneously. Next, the moving board 56 is opened. At this time, due to the shape or the like of the molding, the body portion H is left in the slide side recess 57 of the slide mold 55, and the cover member F is left in the stationary side recess 52 of the stationary mold 41. The state thus opened is shown in FIG. 4B.

Figure 4C:
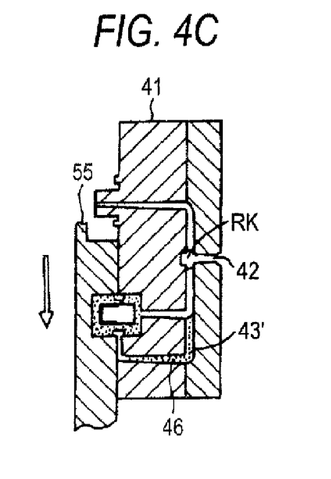
FIG. 4C is the state after the secondary molding, in reduced scales.

By utilizing the multi-articulated robot 21, as described hereinbefore, the depositing chamber 25 is so pushed on the parting line face P of the slide mold 55 through the O-ring as to surround the body portion H or the slide side recess 57. Then, the thin film U is formed, as described hereinbefore. The depositing chamber 25 is retracted. Then, the slide mold 55 is slid to the secondary molding position, at which the openings of the body portion H and the cover member F are registered. This registered position is shown in FIG. 4C. The mold is closed at this registered position. Then, the sprue switching device RK is switched to inject the secondary molding molten resin from the main sprue 42. The molten resin flows from the secondary molding third sprue 46 through a runner 43' and fills up the jointing cavity M. Thus, there is obtained the hollow molding which has the body portion H and the cover member F integrated with each other and which has the thin film on its inner surface.

FIG. 5 shows a third embodiment, which is composed of a disc-shaped or column-shaped stationary mold 60, and a disc-shaped or column-shaped rotary mold 70. FIG. 5A presents a perspective view showing the stationary mold 60 and FIG. 5B presents a perspective view taken from the side of the parting line face P with its rotary disc 70 being opened. In the parting line face P of the stationary mold 60, as shown, a stationary side recess 61 for forming the body portion is formed at a position radially offset at a predetermined amount from the center position. Moreover, a stationary side core 62 for forming the cover member is formed at a position circumferentially spaced by 120 degrees from that stationary side recess 61. Moreover, a stationary side relief 63 is formed at a position circumferentially spaced by 120 degrees from the stationary side recess 61 or the stationary side core 62. This stationary side relief 63 is formed to have a predetermined depth for receiving the core of the body portion forming core at the secondary molding time, as will be described hereinafter. In the center portion of the stationary mold 60 thus formed, there is formed a sprue 64 which communicates with the nozzle of the injection machine. This sprue 64 is opened in the stationary side recess 61 through a runner 65 formed in the parting line face P and through the not-shown gate.

In the parting line face P of the rotary mold 70, a rotary side core 71 and a rotary side recess 72 are formed at a circumferential spacing of 120 degrees. This rotary side core 71 pairs up with the stationary side recess 61 and forms, when closed at a predetermined position, a cavity for forming the body portion. On the other hand, the rotary side recess 72 coacts with the stationary side core 62 to form a cavity for forming a cover member In the rotary mold 70, too, a rotary side relief 73 is formed at a position spaced 120 degrees from the rotary side core 61 or the rotary side recess 72. In this rotary side recess 73, there comes the cover member forming stationary side core 62 at the secondary molding time. In the parting line face P at the center portion of the rotary mold 70 thus formed, there is formed a runner 75 which communicates with the rotary side recess 72 through the gate.

On the outer circumference of the stationary side core 62 or the rotary side core 71, there is formed the small core for forming a recess to be jointed to the opening of the body portion or the cover member, as shown in FIGS. 1 and 4 or disclosed in Japanese Patent No. 3,326,752 and Japanese Patent No. 3,047,213, although not shown in FIG. 5. Neither shown the drive device or the closing device for driving the rotary mold 60 by a predetermined angle or in a reciprocal manner. The apparatus shown in FIG. 2 is applied to the deposition apparatus 20.

Figure 5A:
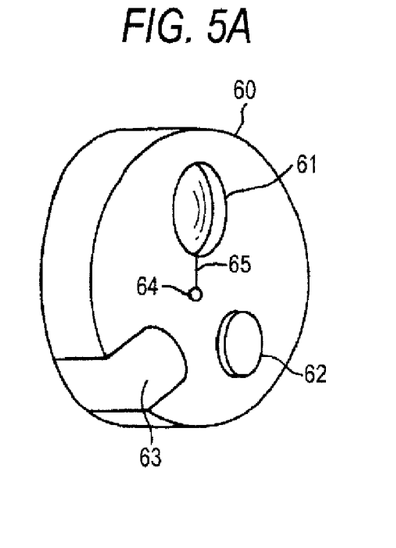
FIGS. 5A and 5B are perspective views showing a stationary mold, and an opened rotary mold, as seen from the parting line side.
Figure 5B:
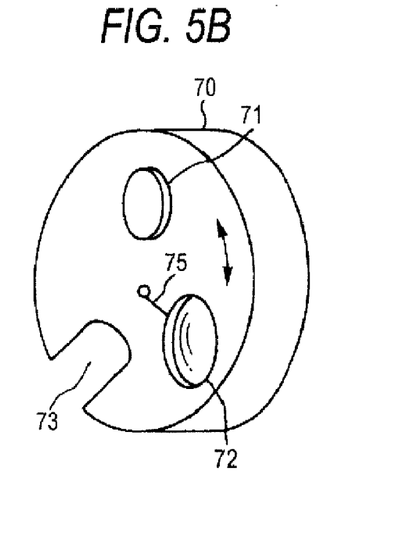
Figure 5C:
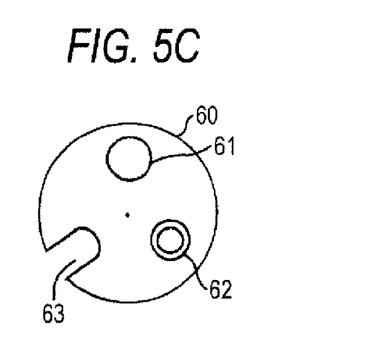
FIGS. 5C to 5F are top plan views showing individual shaping steps, as taken from the parting line side, by opening the stationary mold and the rotary mold.
Figure 5D:
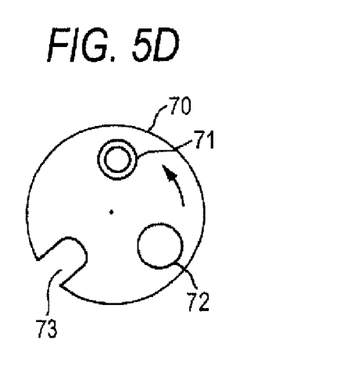

FIGS. 5A and 5B are perspective views of the stationary mold 60 and the rotary mold 70 while being opened and observed from the side of the parting line face P, respectively. FIGS. 5C to 5F are top plan views of the molds 60 and 70 while being opened and observed from the parting line face P. The molding examples using the molds 60 and 70 are explained with reference to those Figures. The molds are mold-clamped in the state shown in FIGS. 5A and 5B or FIGS. 5C and 5D. Then, the cavity for forming the body portion is formed by the stationary side recess 61 of the stationary mold 60 and the rotary side core 71 of the rotary mold 70. On the other hand, the cavity for forming the cover member is formed by the stationary side core 62 of the stationary mold 60 and the rotary side recess 72 of the rotary mold 70. Moreover, the runners 65 and 75 are opened into the cavity through the gate. The molten resin to be injected/charged from the sprue 64 flows through the individual runners 65 and 75 and fills up the individual cavities. By this primary molding, the body portion and the cover member are molded substantially simultaneously. After cooled and solidified to some extent, the rotary mold 70 is opened while the body portion is left in the stationary side recess 61 of the stationary mold 60 and while the cover portion is left in the rotary side recess 72 of the rotary mold 70. Then, the stationary side recess 61 having the left body portion is pushed onto the parting line face P while being enclosed by the depositing chamber 25. Thus, the thin film is formed on the inner circumference of the body portion, as has been described hereinbefore.

Figure 5E:
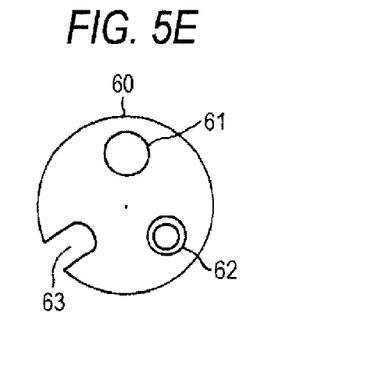
Figure 5F:
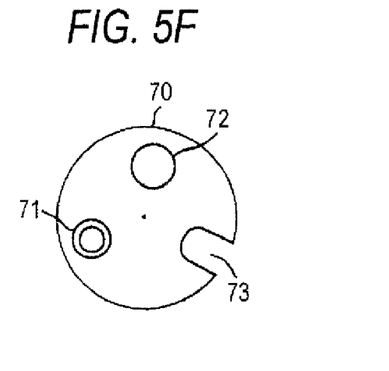

When the formation of the thin film is ended, the depositing chamber 25 is retracted from between the parting line faces P. The rotary mold 70 is turned clockwise and counter-clockwise by 120 degrees, as indicated by arrows in FIG. 5B. Then, the body portion left on the stationary side recess 61 of the stationary mold 60 after deposited and the cover member left on the rotary side recess 72 are registered with each other at their openings. In this registered state, as shown in FIGS. 5E and 5F, the stationary side core 62 of the stationary mold 60 is positioned in the rotary side recess 73 of the rotary mold 70, and the rotary side cover 72 of the rotary mold 70 is positioned in the stationary side relief 63 of the stationary mold 60. As a result, it is possible to mold-clamp the molds. After the molds are mold-clamped, the secondary molding resin (not-shown) fills up the joint space of the abutting portion between the body portion and the cover member. This secondary molding produces the hollow molding having the thin film on its face, of which the body portion has the thin film on its inner circumference.

In the third embodiment thus far described, the stationary side recess 61, the stationary side core 62 and the stationary side relief 63 are formed in the stationary mold 60 at a circumferential spacing of 120 degrees. What can be produced in one cycle is only one hollow molding having the thin film on its inner surface. If, however, two similar recesses or cores are provided at an interval of 60 degrees, it is apparent that two hollow moldings can be formed in one cycle. It is also apparent that the thin film can also be formed on the inner surface of the cover member.

What is claimed is:

1. A molding apparatus for forming a hollow molding having a thin film on its inner surface, comprising:
    a molding device comprising:
        a stationary mold comprising a stationary core and a stationary recess on a parting line side for forming paired semi-hollow bodies; and
        a movable mold movable to a first molding position and a second molding position with respect to the stationary mold, comprising a movable recess and a movable core on a parting line side for coacting with the stationary core and the stationary recess; and
    a depositing device provided separately from the molds,
    wherein a pair of semi-hollow bodies are primarily formed at the first molding position of the movable mold by the stationary core and the movable recess and by the stationary recess and the movable core,
    wherein the paired semi-hollow bodies left in the stationary recess and the movable recess are secondarily formed and integrated at the second molding position of the movable mold,
    wherein the depositing device comprises a depositing chamber to be inserted between the parting lines of the molds when opened, and
    wherein the depositing chamber comprises:
        a seal device disposed at its opening and forced in a gas-tight state to contact with the parting line face of the stationary mold or the movable mold, and
        a deposition element comprising a target electrode, a substrate electrode and a vacuum suction pipe;
    wherein the gas-tight state is achieved without bringing the stationary mold into contact with the movable mold.

2. The molding apparatus for forming a hollow molding according to claim 1,
    wherein the movable mold is turnable to the first molding position and the second molding position with respect to the stationary mold.

3. The molding apparatus for forming a hollow molding according to claim 1, wherein the depositing device comprises a multi-articulated robot for inserting the depositing chamber between the parting lines of the molds when opened.

4. The molding apparatus for forming a hollow molding according to claim 2, wherein the stationary mold further comprises a stationary relief on the parting line side, the stationary relief for receiving the movable core when the movable mold is turned to the second molding position; and
    wherein the movable mold further comprises a movable relief on the parting line side, the movable relief for receiving the stationary core when the movable mold is turned to the second molding position.

5. The molding apparatus for forming a hollow molding according to claim 2, wherein the stationary mold and the movable mold comprise a disc-shaped rotary mold.

6. The molding apparatus for forming a hollow molding according to claim 3, wherein the depositing device is configured to deposit the thin film onto one of the pair of semi-hollow bodies after the pair of semi-hollow bodies is formed.

7. The molding apparatus for forming a hollow molding according to claim 3, wherein the depositing device is configured to deposit the thin film directly onto one of the pair of semi-hollow bodies.

* * * * *